United States Patent Office 3,443,432
Patented May 13, 1969

3,443,432
FLOWMETER
Leonid Nikolaevich Shonin, Leninsky prospekt, 68/10, kv. 58; Jury Sergeevich Konoplev, ulitsa Kots jubinskogo, 3, korpus 2, kv. 13; Jury Alexandrovich Komarov, ulitsa Matrosskaya Tishina, 19, kv. 62; Igor Nikolaevich Ivanov, ulitsa Generala Ermolova, 2, kv. 79; Mikhail Danilovich Silin, ulitsa Udaltsova, 49; Nina Petrovna Veyalis, Shmidtovsky proezd, 5; and Vera Borisovna Karpinskaya Astrakhanisky pereulok, 18, kv. I, all of Moscow, U.S.S.R.
Filed Mar. 22, 1967, Ser. No. 625,157
Claims priority, application U.S.S.R., Mar. 30, 1966, 1,065,760
Int. Cl. G01f 1/00
U.S. Cl. 73—194     7 Claims

ABSTRACT OF THE DISCLOSURE

A flowmeter having a hollow non-magnetic casing for the flow of a fluid therethrough under a swirling motion with a free magnetic ball in the casing for undergoing travel in the swirling flow, the casing having an interior wall along which the ball travels under the action of the swirling fluid, said wall being a surface of rotation whose diameter diminishes gradually and continuously in the direction of flow. A signal pickup device is installed outside the casing in the path of travel of the ball for sensing passage of the ball therepast and for producing signals in response thereto having a frequency corresponding to the mass rate of fluid passing through the casing.

---

This invention relates to devices for controlling flow parameters, and more specifically to flowmeters having a sensitive element is made in the form of a ball which is caused to rotate by the swirling action of the flow of the medium.

There exist flowmeters for measuring the volumetric rate of flow in which the sensitive element, a ball, is caused to rotate by the swirling action of liquid flow (cf. U.S. Patent No. 2,518,149). These flowmeters comprise a casing whose cylindrical chamber accommodates a free ball driven by the swirling liquid flow being measured and acting magnetically upon the device for picking up the measurement signal, mounted outside the casing. The flowmmeters of this design are capable of metering the volumetric rate of flow only.

In industrial processes involving the measurements of the rate of flow of a medium the density of the medium usually varies by the effect of such conditions as temperature, concentration, etc. so that in these cases it becomes necessary to measure the mass rate of flow.

It is therefore, an object of this invention to provide a device capable of metering both the volumetric and mass rates of flow.

This object is achieved by making the interior wall of the casing, against which the ball is driven, in the form of a surface of rotation whose diameter diminishes gradually in the direction of the flow.

In order to reduce the changes in the velocity of the flow caused by a reduction of the area through the flowmeter, a hub is placed inside the casing chamber mounted along the casing axis, the outer diameter of the hub gradually and smoothly diminishing in the direction of the flow so that this, combined with the above-mentioned reduction of the diameter of the interior circular wall of the casing, ensures a constancy of the area through the flowmeter along the length of the casing.

The interior chamber of the casing may be limited by one or two bushings.

The invention will now be described by way of example with reference to the accompanying drawings in which.

Figure 1:
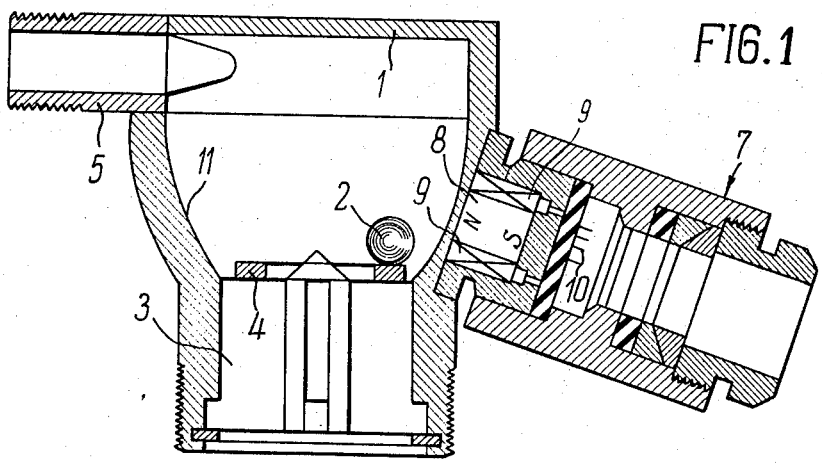
FIG. 1 illustrates in longitudinal section an embodiment of the flowmeter according to the invention.

The flowmeter (FIGS. 1, 2 and 3) comprises a hollow nonmagnetic casing 1 accommodating a free ball 2 possessing ferromagnetic properties, and a device for producing linear flow comprising a group of plates 3 installed parallel with the casing axis, for imparting linear flow to the fluid before discharge from the casing. The axial movement of the ball by the flow is limited by a limiting ring 4 installed on the plates 3. A pipe connection 5 (FIG. 1) located tangentially with respect to the interior wall of the casing 1 ensures a circular swirling action of the flow being measured. The flow can also be swirled by inclined vanes 6 (FIGS. 2 and 3) installed in the casing 1. Mounted on the external surface of the casing 1 is a signal pickup device 7 consisting of a permanent magnet 8 (FIG. 1), an induction coil 9 and terminals 10.

The interior wall 11 of the casing 1 against which the ball travels is constituted as a surface of rotation whose diameter diminishes gradually in the direction of the flow.

The flowmeter functions as follows.

The flow of the medium being measured, passing through the pipe connection 5, is caused to swirl around the axis of the casing 1 and drives the ball 2 which rotates under the swirling action of the flow around the axis of the casing in a plane normal to said axis at a frequency proportional to the mass rate of flow.

The frequency of ball rotation is registered by the signal pickup device 7.

The pulses induced in the coil 9 when the ball 2 passes across the field of the magnet 8 are supplied as output signals at terminals 10 and are indicative of the mass rate of flow.

The frequency of ball rotation can be expressed as follows:

$$f = V_b / 2\pi r \qquad (1)$$

where:

$f$ = frequency of ball rotation,
$V_b$ = linear velocity of the ball,
$r$ = distance of the ball center of gravity from the axis of rotation.

The value of the linear velocity of the ball can be derived from the expression:

$$V_b = V . \sin \varphi \qquad (2)$$

where:
$V$ = velocity of the medium being measured (FIG. 2),
$\varphi$ = the angle between the vector of the flow velocity and the axis of the flow meter.

Figure 4:
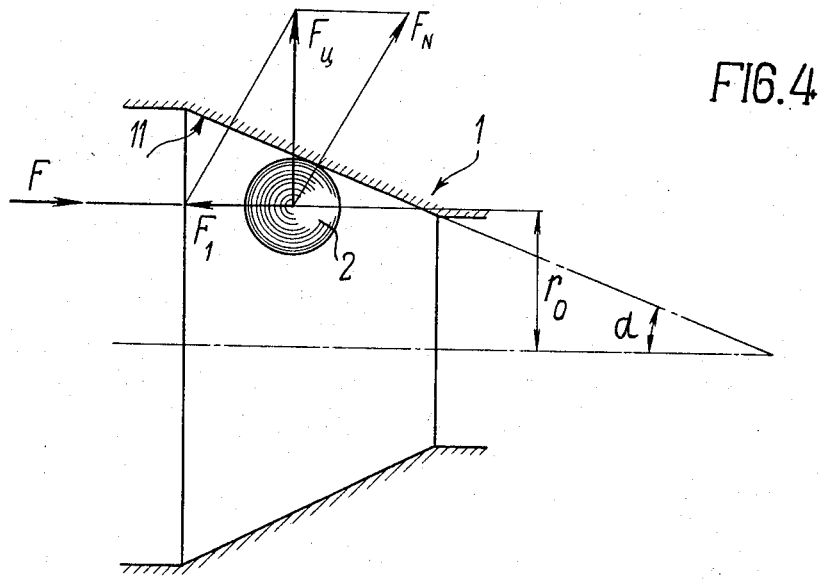
FIG. 4 is a diagram showing the main forces applied to the ball.

Under steady flow conditions (at constant velocity and density of the medium being measured) the ball is acted upon by the following main forces (FIG. 4):

F is the hydrodynamic force of the flow, and
$F_c$ is the centrifugal force originated by rotation of the ball around the casing axis.

The centrifugal force $F_c$ can be resolved into the following components:

$F_n$—normal to the surface of the casing, this component being made up for by the casing reaction, and
$F_1$—whose direction is parallel with the casing axis.

Thus, if the interior wall of the casing, against which the ball travels, is made in the form of a surface of rotation whose diameter gradually diminishes in the direction of the flow, this creates a force $F_1$ directed against the flow. The force F can be expressed as:

$$F = C_X S \frac{\rho V^2}{2}$$

where:

$C_x$ = coefficient of frontal resistance of the ball,
S = middle section of the ball,
$\rho$ = density of the medium being measured.

The force $F_c$ can be expressed as:

$$F_c = m \frac{V_b^2}{2}$$

where:

m = mass of the ball.

The equilibrium of the ball along the casing axis can be ensured provided $$F = F_1 \quad (3)$$

Substituting the values of these forces we get:

$$C_X S \frac{\rho \cdot V^2}{2} = m \frac{V_b^2}{2} \tan \alpha \quad (4)$$

where:

$\alpha$ = angle formed by the casing axis with a line tangent to the casing wall at the point of contact between the ball and the casing.

Then, substituting in Equation 1 expression (2) and the value of x found from the expression (4) we obtain:

$$f = K \cdot \rho \cdot v$$

where:

$$K = \frac{C_X S}{4\pi m \cdot \tan \alpha \cdot \sin \varphi}$$

is a constant coefficient.

With the unchanging value of the mass rate of flow the plane of ball rotation and, correspondingly, its rotation frequency (f) remain constant. If only the velocity (V) of the flow is changed this will not change the plane of the ball rotation but will change its rotation frequency (f). If only the density ($\rho$) of the medium is changed this will change the plane of ball rotation and, correspondingly, it will also change the frequency of rotation (f). Hence, the frequency of ball rotation is proportional to the mass rate of flow.

Figure 2:
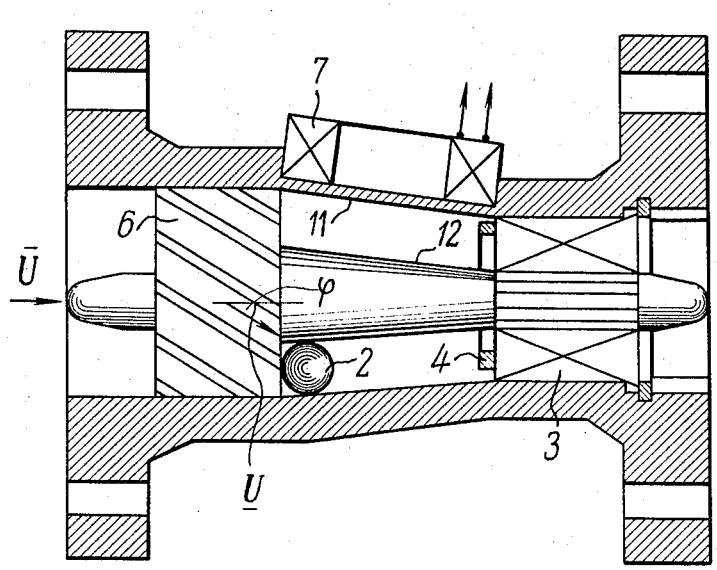
FIG. 2 is a longitudinal sectional view of another embodiment of the flowmeter with a hub installed in the chamber of the casing along the axis of the latter.
Figure 3:
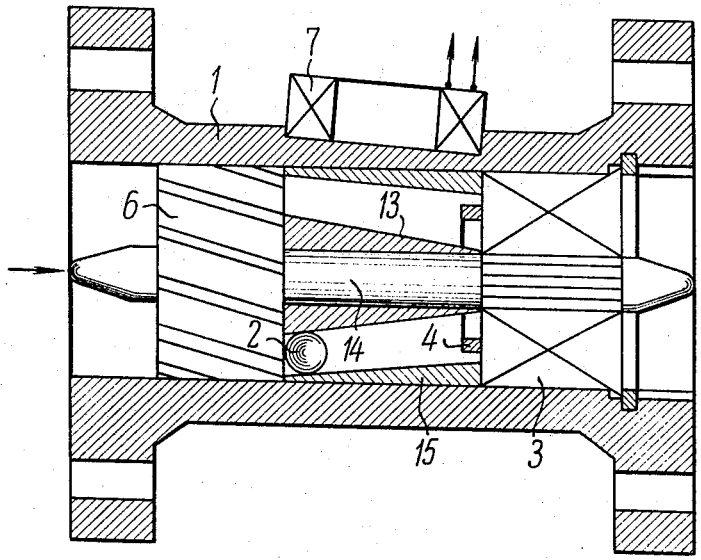
FIG. 3 is a longitudinal sectional view of another embodiment of the flowmeter with detachable bushings limiting the chamber of the casing.

The flow meter illustrated in FIG. 2 is an embodiment of the invention in which, with a view to reducing the changes in the velocity of the flow caused by the reduction of the area through the meter, the chamber of the casing 1 is provided with a hub 12 installed along the casing axis, the external diameter of said hub gradually and continuously diminishing in the direction of the flow so that this, combined with the above-mentioned reduction of the diameter of the casing interior wall, ensures a constant section through the chamber along a wall 11 length of the casing 1.

The chamber through which the flow moves can be limited by two detachable bushings (FIG. 3) one of which 13 is secured on the hub 14 and the other 15 is secured to the interior of the casing 1.

The use of the detachable and replaceable bushings 13 and 15 provides for ease of manufacture and setting of the instrument for different measurement ranges.

What is claimed is:

1. A flowmeter comprising a hollow non-magnetic casing for the flow of a fluid therethrough, means for producing a swirling motion of the fluid flow within the casing, a free magnetic ball in said casing downstream of said means for undergoing travel in the swirling flow, said casing having an interior wall along which the ball travels under the action of the swirling fluid, said wall being a surface of rotation whose diameter diminishes gradually and continuously in the direction of fluid flow, and a magnetic sensing device installed outside said casing in the path of travel of the ball for sensing passage of the ball therepast and for providing signals in response thereto having a frequency corresponding to the mass rate of the fluid passing through the casing.

2. A flowmeter as claimed in claim 1 wherein said casing has a fluid inlet and outlet and includes means upstream of the outlet for converting the swirling motion of the fluid to a linear motion.

3. A flowmeter as claimed in claim 2 comprising means in said casing, disposed upstream of the means which converts the swirling motion of the fluid to linear motion and downstream of the means which produces the swirling motion of the fluid, for retaining the ball in the casing and preventing further travel downstream therein.

4. A flowmeter as claimed in claim 3 comprising a hub in said casing extending along the axis thereof between the means which produces the swirling motion of the fluid and the means which retains the ball in the casing, said hub having an outer surface with a diameter which gradually and continuously diminishes in the direction of fluid flow.

5. A flowmeter as claimed in claim 4 wherein the hub and interior wall of the casing define a passageway of constant area along the length of the casing in the direction of fluid flow.

6. A flowmeter as claimed in claim 4 comprising a detachable bushing in the casing constituting the inner wall thereof.

7. A flowmeter as claimed in claim 6 comprising a second detachable bushing mounted on the hub and constituting the outer surface thereof.

References Cited

UNITED STATES PATENTS

| 2,518,149 | 8/1950 | Kearsley. | |
| 3,000,210 | 9/1961 | Faure-Herman | 73—231 |

FOREIGN PATENTS

| 125,908 | 3/1960 | U.S.S.R. |

RICHARD C. QUEISSER, *Primary Examiner.*

EDWARD D. GILHOOLY, *Assistant Examiner.*

U.S. Cl. X.R.

73—255